United States Patent [19]
Oyama

[11] Patent Number: 5,419,075
[45] Date of Patent: * May 30, 1995

[54] FISHING LINE GUIDE

[75] Inventor: Mitsuyoshi Oyama, Tokyo, Japan

[73] Assignee: Daiwa Seiko, Inc., Tokyo, Japan

[*] Notice: The portion of the term of this patent subsequent to Feb. 8, 2011 has been disclaimed.

[21] Appl. No.: 99,342

[22] Filed: Jul. 30, 1993

Related U.S. Application Data

[63] Continuation-in-part of Ser. No. 905,388, Jun. 29, 1992, Pat. No. 5,283,973.

[30] Foreign Application Priority Data

Jul. 5, 1991 [JP] Japan ................ 3-60188 U

[51] Int. Cl.⁶ ................................. A01K 87/04
[52] U.S. Cl. ................................. 43/24
[58] Field of Search ................ 43/24; D22/143

[56] References Cited

U.S. PATENT DOCUMENTS

| | | | |
|---|---|---|---|
| 670,961 | 4/1901 | Lenharth | 43/24 |
| 1,923,263 | 8/1933 | Heddon | 43/24 |
| 2,227,868 | 1/1941 | Tengel | 43/24 |
| 3,171,228 | 3/1965 | Cwik | 43/24 |
| 4,218,841 | 8/1990 | Gallagher et al. | 43/24 |
| 5,311,695 | 5/1994 | Yasui | 43/24 |

FOREIGN PATENT DOCUMENTS

| | | | |
|---|---|---|---|
| 56-19209 | 5/1981 | Japan . | |
| 2-31468 | 2/1990 | Japan . | |
| 3-155736 | 7/1991 | Japan | 43/24 |
| 2250413 | 6/1992 | United Kingdom | 43/24 |
| 2260471 | 4/1993 | United Kingdom | 43/24 |

Primary Examiner—P. Austin Bradley
Assistant Examiner—Jeanne M. Elpel
Attorney, Agent, or Firm—Longacre & White

[57] ABSTRACT

A fishing line guide has an attaching seat 2 attached to a fishing rod and a fishing line guide part 5 located above the attaching seat 2. The fishing line guide part 5 has width substantially equal to or smaller than the width of the attaching seat 2, inclined surfaces 6, 7 formed from front and rear end faces to front and rear parts of the attaching seat 2 and side faces formed in smoothly sloped surfaces. The fishing line guide part 5 is configured in a sloping form in section so that the circumferential length in each horizontal plane of the fishing line guide part 5 is smaller than the circumferential length in each horizontal plane taken closer to the axis of the fishing rod. Therefore, a fishing line twining on the fishing line guide part 5 can smoothly and easily loosen upward and thus, can be prevented from tangling on the fishing line guide.

9 Claims, 3 Drawing Sheets

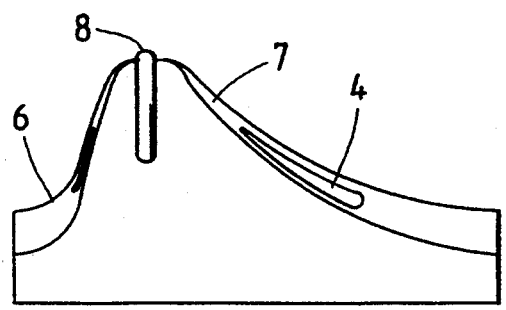
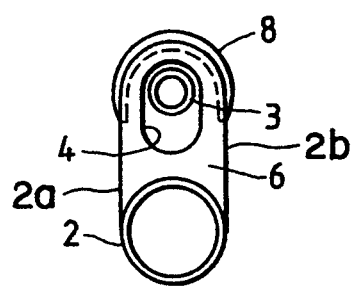
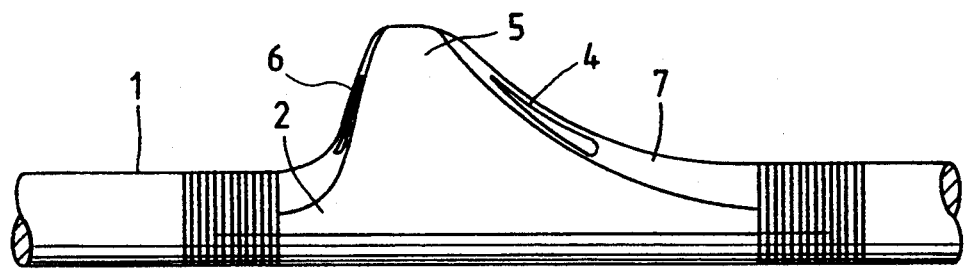
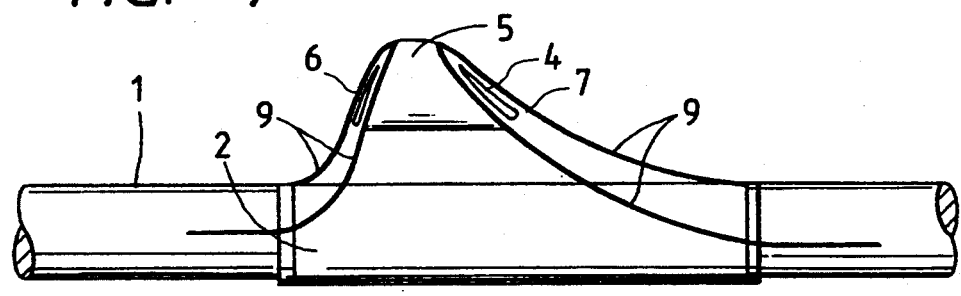

FISHING LINE GUIDE

This application is a Continuation-in-part of U.S. patent application Ser. No. 07/905,388, filed on Jun. 29, 1992; now U.S. Pat. No. 5,283,973.

BACKGROUND OF THE INVENTION

The present invention relates to an improved fishing line guide mounted on a fishing rod.

In the case where the fishing line is loosened, it has been liable to often tangle and twine on the fishing line guide mounted on the fishing rod. A means for preventing the fishing line from tangling, namely, an anti-tangling member has been known. For example, a protection line is extended on the upper part of a fishing line guide ring of a fishing line guide, as disclosed in Japanese Unexamined Utility Model Publication No. 2-31468, or an attaching member of a fishing line guide is configured in a linear and inclined form, as disclosed in Japanese Examined Patent Publication No. 56-19209.

However, in the former case, not only a means such as a fishhook clings to the protection line, but also the protection line inconveniently deteriorates flexibility of the fishing rod. Since, in both the above-mentioned methods, the width of the fishing line guide at a fishing rod attaching part is smaller than that (diameter) of the fishing line guide ring, when the fishing line engages with the narrow part, the tangling of the fishing line cannot be canceled.

The U.S. Pat. No. 4,218,841 discloses another conventional fishing rod which is made in one piece of molded plastic so as to include the row of eyelets. However, since these eyelets are formed of plastic, they do not have enough strength to guide a fishing line during fishing. Further, the fishing line is likely to be in contact with the fishing rod particularly when the fishing rod is bend, to make the resistance therebetween be increased. Further, in a case where a longitudinal extending groove is provided in a fishing rod to form a fishing line guide path, the fishing rod itself is deteriorated to decrease its strength.

SUMMARY OF THE INVENTION

The present invention was made in order to solve the problems mentioned above.

Accordingly, it is an object of the present invention to provide a fishing line guide by which a fishing line can be effectively prevented from tangling when the fishing line is loosened during fishing.

For achieving the above object, a fishing line guide according to the present invention comprises an attaching seat with width substantially equal to the diameter of a fishing rod to which it is attached and a fishing line guide part located adjacent the attaching seat, wherein the width of the fishing line guide part is substantially equal to or smaller than the width of the attaching seat and inclined surfaces are formed respectively from front and rear faces of the fishing line guide part to front and rear parts of the attaching seat so that sides of the fishing line guide part have smoothly curved surfaces.

The attaching seat may be formed integrally with the fishing line guide part, or may be formed separately from the fishing line guide part so that the inclined surfaces of front and rear end faces of the fishing line guide part are connected to the attaching seat by line member. The front end face of the fishing line guide part is preferably formed in an inclined surface steeper than that of the rear end face. Further, the attaching seat may be configured in a cylindrical form so as to be fitted to the fishing rod, or configured in a circular arc in section so as to be fitted to the upper half part of the fishing rod.

The term "attaching seat", as it is used in this disclosure, refers to a means for specifically facilitating the connection between the fishing rod and the fishing line guide part. As such, the "attaching seat" performs two functions: 1) embracing the fishing rod so as to securely locate a fishing line guide along the longitude of the fishing rod, and 2) supporting the fishing line guide part in a desired orientation so as to controllably retain the fishing line substantially along the longitude of the fishing rod.

According to the present invention, the fishing line guide part is configured in a sloping form with respect to the attaching seat. The circumferential length of the fishing line guide part becomes smaller as it goes to the upper part of the fishline guide, so that even when the fishing line is loosened and twines on the fishing line guide part, it loosens and is pulled upward without tangling. Therefore, the fishing line is prevented from tangling on fishing line guide.

BRIEF DESCRIPTION OF THE DRAWINGS

Other features and advantages of the present invention will be apparent from the following description taken in connection with the accompanying drawings, wherein

FIG. 4 is a perspective view of another embodiment of the present invention;

FIG. 5 is a front view of the embodiment of FIG. 4;

FIG. 6 is a perspective view of a still another embodiment of the present invention; and FIG. 7 is a perspective view of a still another embodiment of the present invention.

FIG. 9b is a front view of the embodiment of FIG. 9a.

DETAILED DESCRIPTION OF THE PREFERRED EMBODIMENTS

Figure 1:
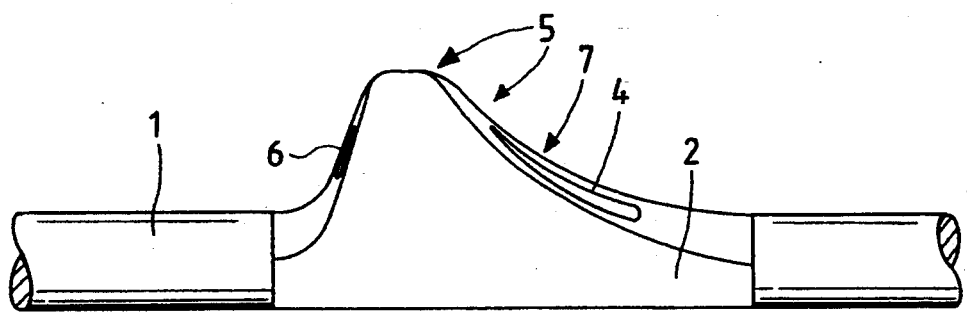
FIG. 1 is a perspective view of a fishing line guide according to the present invention.

The embodiments of the present invention will be described with reference to the accompanying drawings.

In the drawings, a tubular attaching seat 2 made of synthetic resin, ceramics, metal or the like is fitted to a fishing rod 1 about a central axis x—x. The upper part of the attaching seat 2 is formed integrally with a fishing line guide part 5. The fishing line guide part 5 has a fishing line guide hole 4 into which a fishing line guide ring 3 is fitted. The fishing line guide part 5 has width substantially equal to or smaller than the outside diameter of a tubular part which is the width of the attaching seat 2. The fishing line guide part 5 has a front end face 6 and a rear end face 7 so formed as to be respectively inclined toward the front and rear parts of the attaching seat 2. The side faces of the fishing line guide part 5 are formed in smoothly sloped surfaces. The front inclined surface 6 is steeper than the rear inclined surface 7.

Figure 2:
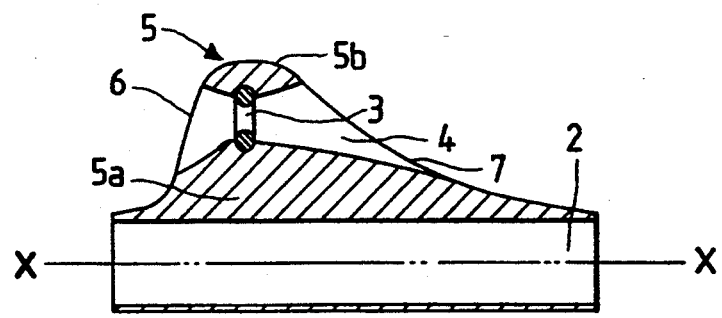
FIG. 2 is a longitudinally sectional side view of the fishing line guide taken along section line II—II of FIG. 3.

In the above-mentioned embodiment of the fishing line guide according to the present invention, the fishing line guide part 5 is configured in a sloping form in section so that the circumferential length of the guide part 5 in each horizontal plane becomes smaller as each horizontal plane is taken at a region further from the attaching seat 2. The fishing line guide part 5 has a proximate region 5a and a distal region 5b with respect to the attaching seat 2. With reference to the section taken in FIG. 2, the circumferential length of each horizontal plane will decrease from the proximate region 5a to the distal region 5b. Therefore, even when a fishing line twines on the fishing line guide part 5, the fishing line loosens by pulling it upward. Thus, the fishing line can be prevented from engaging with and tangling on the fishing line guide part 5. Between the fishing line guide part 5 and the attaching seat 2 may be formed a hollow part so that a light-weight fishing line guide can be realized. The fishing rod may be formed as a one-piece member including a plurality of integral fishing line guides as constructed above. Alternately, the fishing line guides may be formed as separate members with respective dimensions of tubular attaching seats 2 so that the fishing line guides are fitted around the fishing rod at their respective positions by utilizing a taper of the fishing rod.

Figure 9A:
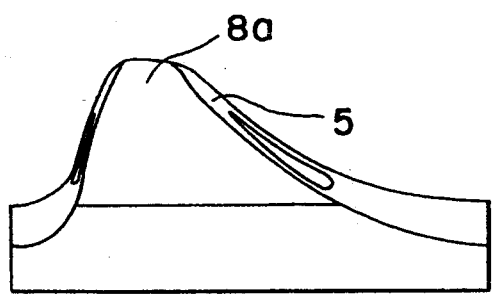
FIG. 9a is a perspective view of another embodiment of the present invention.
Figure 9B:
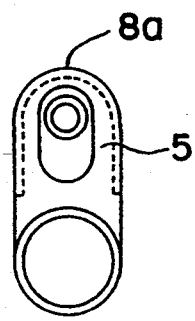

Another embodiment shown in FIGS. 4, 5, 9a and 9b illustrates a fishing line guide defining two parallel sides 2a, 2b extending between the attaching seat 2 and guide part 5, and having a protecting frame 8 with abrasion resistance and impact resistance provided on a fishing line guide part 5. FIGS. 9a and 9b illustrate a protective frame 8a formed as a substantially U-shaped plate member provided on the fishing line guide part 5 and extending the entire longitudinal dimension of the guide part 5, as opposed to FIGS. 4 and 5 which disclose a protective frame 8 in the form of a narrow impact resistant strip extending in the transverse direction. For FIGS. 4, 5, 9a and 9b the plate 8, 8a is made of rubber, elastomer resin, synthetic resin or the like having sufficient impact absorption properties. The plate member 8, 8a may be securely attached to the guide part or otherwise may be integrally molded on the guide part. The plate member 8a provided on the guide part 5 defines a conical surface around the fishing line guide part without any protrusion so that the fishline is prevented from tangling thereon. FIG. 6 shows a still another embodiment of a fishing line guide in which an attaching seat 2 is formed in a circular arc in section, fitted into the upper half part of a fishing rod 1 and fixed to the fishing rod by filament members. FIG. 7 shows still another embodiment of a fishing line guide in which a tubular attaching seat 2 and a fishing line guide part 5 are separately formed and line members 9, made of metal or the like at both sides of inclined surfaces 6, 7 of the fishing line guide part 5, are extended and fixed to the front and rear parts of the attaching seat 2 so that the weight of the fishing line guide is reduced. In this case, the line members 9 may be further extended so that the line members 9 can abut on a fishing rod 1 to further secure the attaching seat 2 to the rod 1. The attaching seat 2 of the line members 9 may be also secured to the fishing rod 1 by means of filament members.

As mentioned before, according to the present invention, the fishing line guide has width substantially equal to or smaller than the width of the attaching seat, the front end face and the rear end face are respectively inclined and connected to the front and rear parts of the attaching seat and the side faces are formed in smoothly sloped surfaces. Further, the fishing line guide is configured in a sloping form in section such that the circumferential length in each horizontal plane of the fishing line guide part becomes smaller from the proximate region to the distal region of the guide part. Thus, even when a fishing line twines on the fishing line guide part, it can smoothly and easily loosen upward by pulling it upward. Therefore, the fishing line can be effectively prevented from tangling on the fishing line guide when it is loosened.

Figure 3:
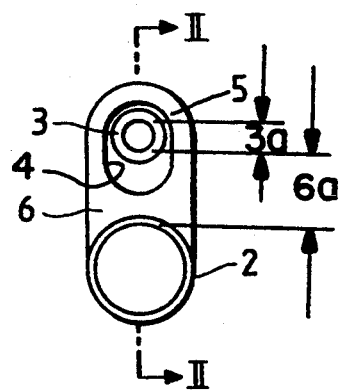
FIG. 3 is a front view of the fishing line guide.
Figure 8:
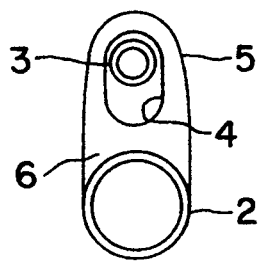
FIG. 8 is a front view of a further embodiment of the fishing line guide.

Further, since the fishing line guide hole is formed to be passed through the fishing line guide part and deviated from the fishing rod, the fishing line is hard to contact with the fishing rod to reduce the resistance therebetween even if the fishing rod is bent. FIG. 3 illustrates the arrangement of the invention whereby the inner diameter 3a of the fishing line guide ring 3 is less than a minimum distance 6a between the fishing rod 1, which is received in the attaching seat 2, and the inner diameter of the ring 3. Furthermore, since the fishing line guide ring for smoothly guiding the fishing line thereon is fitted into the fishing line guide hole, the fishing line guide ring is reinforced by the fishing line guide part to prevent the breakage of the guide ring. In a case where the fishing line guide of the present invention is manufactured as a separate member from the rod and the fishing line is then fitted around the rod, no adverse effect is applied to the fishing rod's characteristics and it is possible to provide the fishing rod having desired uniform strength entirely with high productionability.

In addition, according to the present invention, the fishing line guide part and the attaching part may be formed separately and the front inclined surface and the rear inclined surface of the fishing line guide part may be extended and fixed to the attaching seat by the line members, so that the weight of the fishing line guide can be reduced and the manipulation of a fishing rod is facilitated.

The present invention is not restricted to the embodiments described above, but may be embodied or practiced in other various ways without departing the spirits or essential of the invention.

What is claimed is:

1. A fishing line guide comprising:
   an attaching seat for connecting a fishing line guide part along a longitude of a fishing rod, a portion of said attaching seat defined by two parallel surfaces extends between said fishing rod and said fishing line guide, said two parallel sides defining a transverse width with respect to said longitude which is substantially equal to a diameter of said fishing rod at a section of said fishing rod to which it is attached,
   said fishing line guide part having a fishing line guide hole passing therethrough substantially parallel to said longitude, and
   an annular fishing line guide ring is fitted into said fishing line guide hole.

2. The fishing line guide according to claim 1, wherein said attaching seat includes a thin wall tubular portion having a central axis, said fishing rod extends through said thin wall tubular portion and said central axis is substantially parallel to said longitude.

3. The fishing line guide according to claim 1, wherein an inner diameter of said fishing line guide ring is less than a minimum distance between said fishing rod and said inner diameter.

4. A fishing line guide comprising:
- an attaching seat for connecting a fishing line guide part to a fishing rod, a portion of said attaching seat having a width substantially equal to a diameter of the fishing rod at a section of said fishing rod to which it is attached;
- the fishing line guide part is located along a longitude of the fishing rod by the attaching seat, said fishing line guide part having a corresponding width substantially equal to or smaller than the width of the attaching seat, and said fishing line guide part is formed with front and rear end faces respectively inclined to front and rear parts of the attaching seat with side faces formed as smoothly sloped surfaces, so as to present a substantially conical outer configuration;
- a fishing line guide hole passing through said fishing line guide part, said fishing line guide hole being constricted at an intermediate portion along its longitudinal surface; and
- protection frame for resisting abrasion and impact on said fishing line guide, said protection frame including a substantially U-shaped plate member provided on said fishing line guide part.

5. The fishing line guide according to claim 4, wherein said protection frame is made of a material having impact absorption properties.

6. The fishing line guide according to claim 4, wherein said protection frame is integral with said fishing line guide part.

7. The fishing line guide according to claim 4, wherein said protection frame defines a U-shaped surface around a portion of said fishing line guide part.

8. The fishing line guide according to claim 4, wherein said protection frame is made of rubber, elastomer resin, or synthetic resin.

9. A fishing line guide comprising:
- an attaching seat for connecting a fishing line guide part to a fishing rod;
- the fishing line guide part is located along a longitude of the fishing rod by the attaching seat, said fishing line guide part having a corresponding width substantially equal to or smaller than the width of the attaching seat, and said fishing line guide part is formed with front and rear end faces respectively inclined to front and rear parts of the attaching seat with side faces formed as smoothly sloped surfaces, so as to present a substantially conical outer configuration;
- a fishing line guide hole passing through said fishing line guide part, said fishing line guide hole being constricted at an intermediate portion along its longitudinal surface; and
- a protection frame for resisting abrasion and impact on said fishing line guide, said protection frame including a substantially U-shaped plate member provided on said fishing line guide part.

* * * * *